(12) United States Patent
Song et al.

(10) Patent No.: US 7,602,571 B2
(45) Date of Patent: Oct. 13, 2009

(54) APPARATUS AND METHOD TO CONTROL FLYING HEIGHT OF MAGNETIC HEAD IN RETRY MODE AND DISK DRIVE USING THE SAME

(75) Inventors: Myung-wook Song, Suwon-si (KR); Hyun-bum Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 11/695,094

(22) Filed: Apr. 2, 2007

(65) Prior Publication Data
US 2007/0230019 A1  Oct. 4, 2007

(30) Foreign Application Priority Data
Apr. 4, 2006  (KR) ...................... 10-2006-0030499

(51) Int. Cl.
*G11B 21/02* (2006.01)
(52) U.S. Cl. ...................................................... 360/75
(58) Field of Classification Search .................. 360/75, 360/67, 53, 77.02, 294.7
See application file for complete search history.

(56) References Cited

U.S. PATENT DOCUMENTS

| | | | |
|---|---|---|---|
| 5,818,656 A * | 10/1998 | Klaassen et al. | 360/67 |
| 5,999,360 A * | 12/1999 | Meyer et al. | 360/77.02 |
| 6,147,827 A * | 11/2000 | Southerland et al. | 360/53 |
| 6,952,330 B1 * | 10/2005 | Riddering et al. | 360/294.7 |
| 7,023,645 B1 * | 4/2006 | Emo et al. | 360/75 |
| 7,061,706 B2 * | 6/2006 | Conteras et al. | 360/75 |
| 7,088,545 B1 * | 8/2006 | Singh et al. | 360/75 |
| 7,352,525 B1 * | 4/2008 | Shrestha et al. | 360/75 |
| 7,385,778 B2 * | 6/2008 | Kakiki | 360/75 |
| 2005/0216800 A1 * | 9/2005 | Bicknell et al. | 714/718 |
| 2007/0247744 A1 * | 10/2007 | Satoh et al. | 360/75 |
| 2008/0019032 A1 * | 1/2008 | Hayakawa et al. | 360/75 |

FOREIGN PATENT DOCUMENTS

| | | |
|---|---|---|
| JP | 9-231698 | 9/1997 |
| JP | 10-334626 | 12/1998 |
| JP | 2004-79126 | 3/2004 |

* cited by examiner

*Primary Examiner*—Fred Tzeng
(74) *Attorney, Agent, or Firm*—Stanzione & Kim LLP

(57) ABSTRACT

An apparatus and method to retry data read and write while changing a flying height of a magnetic head in a disk drive. The apparatus includes the magnetic head including a magnetic read element to sense a magnetic field on a disk and a magnetic write element to magnetize the disk, having a structure to generate an air bearing surface between the surface of the disk and the magnetic read and write elements, and includes a heater heating an assembly to generate the air bearing surface, a controller to generate a power control signal to adjust a flying height of the magnetic head in a retry mode, and a heater power supply circuit to generate power corresponding to the power control signal and to supply the power to the heater.

24 Claims, 6 Drawing Sheets

APPARATUS AND METHOD TO CONTROL FLYING HEIGHT OF MAGNETIC HEAD IN RETRY MODE AND DISK DRIVE USING THE SAME

CROSS-REFERENCE TO RELATED APPLICATIONS

This application claims priority from Korean Patent Application No. 10-2006-0030499, filed on Apr. 4, 2006, in the Korean Intellectual Property Office, the disclosure of which is incorporated herein in its entirety by reference.

BACKGROUND OF THE INVENTION

1. Field of the Invention

The present general inventive concept relates to a read/write (R/W) control apparatus and method of a disk drive, and more particularly, to an apparatus and method to retry a data read and write while changing a flying height of a magnetic head in a disk drive.

2. Description of the Related Art

Korean Patent Publication No. 10-2004-0025373 relates to a technique of controlling the variation of a flying height between a write head and a disk according to a write current or over-shoot of the write current.

A hard disk drive (HDD), which is a type of data storage medium, reproduces data written on a disk or writes data on the disk using a magnetic head. As the BPI (bit per inch), i.e., the write density in the disk rotational direction, and the TPI (track per inch), i.e., the write density in a radius direction of the disk, have increased, small-sized and high storage capacity HDDs can be manufactured. Accordingly, a more accurate positional mechanism for the HDD is needed.

A flying height of a magnetic head, which is a gap between the magnetic head and a disk in an HDD, affects read and write performance of the HDD. The read and write performance is more improved as the flying height of the magnetic head is lowered, however, the possibility of collision between the magnetic head and the disk becomes higher. On the contrary, the possibility of collision between the magnetic head and the disk can be reduced as the flying height of the magnetic head becomes higher, however, the read and write performance becomes more degraded.

Considering the above description, the flying height of the magnetic head is determined when the HDD is designed and is usually determined to be a fixed value. The flying height of the magnetic head varies according to user conditions such as ambient temperature, air pressure, and so on.

If an error occurs in a data read and write process, the HDD retries the data read and write process until no error occurs while varying designed parameter values by predetermined times.

According to the prior art, when the data read and write process is retried, the number of retries increases by performing the data read and write process while varying parameters related to the data read and write process with a fixed flying height of the magnetic head, and occasionally, the data read and write process fails.

SUMMARY OF THE INVENTION

The present general inventive concept provides an apparatus and method to control a flying height of a magnetic head in a retry mode in which retries are performed while changing the flying height of the magnetic head, and a disk drive using the same.

The present general inventive concept also provides a computer readable recording medium to store a computer readable program to execute the method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an apparatus to control a flying height of a magnetic head in a retry mode, the apparatus including the magnetic head including a magnetic read element to sense a magnetic field on a disk and a magnetic write element magnetizing the disk, having a structure to generate an air bearing surface between a surface of the disk and the magnetic read and write elements, and including a heater to heat an assembly to generate the air bearing surface, a controller to generate a power control signal to adjust the flying height of the magnetic head in the retry mode, and a heater power supply circuit to generate power corresponding to the power control signal and to supply the power to the heater.

The controller may be designed to generate the power control signal in only a specific retry process among a plurality of retry processes included in the retry mode.

The controller may be designed to generate the power control signal to change the flying height of the magnetic head according to the number of retries and generate the power control signal to differentiate the amplitude of power supplied to the heater in a read retry mode and in a write retry mode.

The controller may disable the heater power supply circuit when the retry mode is terminated.

The power control signal may be controlled to maintain a same flying height of the magnetic head in the read retry mode and in the write retry mode.

The foregoing and/or other aspects and utilities of the present general inventive concept may also be achieved by providing a method of controlling a flying height of a magnetic head in a retry mode, the method including determining whether the retry mode starts in a disk drive, if the retry mode starts, adjusting the flying height of the magnetic head with respect to a surface of a disk, and performing a retry process while changing predetermined parameters according to a preset sequence after adjusting the flying height of the magnetic head.

The flying height of the magnetic head may be adjusted by changing power supplied to a heater included in the magnetic head.

The foregoing and/or other aspects and utilities of the present general inventive concept may also be achieved by providing a disk drive, which is a data storage unit, including a host interface to perform a data transmitting/receiving process with a host device, a disk to store information, a magnetic head including a magnetic read element to sense a magnetic field on the disk and a magnetic write element to magnetize the disk, having a structure to generate an air bearing surface between the surface of the disk and the magnetic read and write elements, and including a heater to heat an assembly to generate the air bearing surface, a write/read circuit to perform a data write or read process on the disk to reproduce data read from the disk, a controller to execute a retry routine by generating a power control signal to adjust the flying height of the magnetic head when an error occurs in the data write and read process performed by the write/read circuit, and a heater power supply circuit to generate power corresponding to the power control signal and to supply the power to the heater.

The foregoing and/or other aspects and utilities of the present general inventive concept may also be achieved by providing a computer readable recording medium to store a computer readable program to execute the method of controlling a flying height of a magnetic head in a retry mode.

The foregoing and/or other aspects and utilities of the present general inventive concept may also be achieved by providing a disk drive including a magnetic head to read data from a disk and to write data to the disk, a positioning unit to move the magnetic head with respect to the disk to create an adjustable air bearing surface between the surface of the disk and the magnetic head, and a controller to generate a power control signal to control the positioning unit in a retry mode of the reading of data or writing of data.

The foregoing and/or other aspects and utilities of the present general inventive concept may also be achieved by providing a method of operating a disk drive to read data from a disk and to write data to the disk, the method including reading data from or writing data to a disk using a magnetic head, generating a power control signal having a value based on a number of retries of the reading data or writing data, and adjusting a position of the magnetic head with respect to the disk based on the generated power control signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
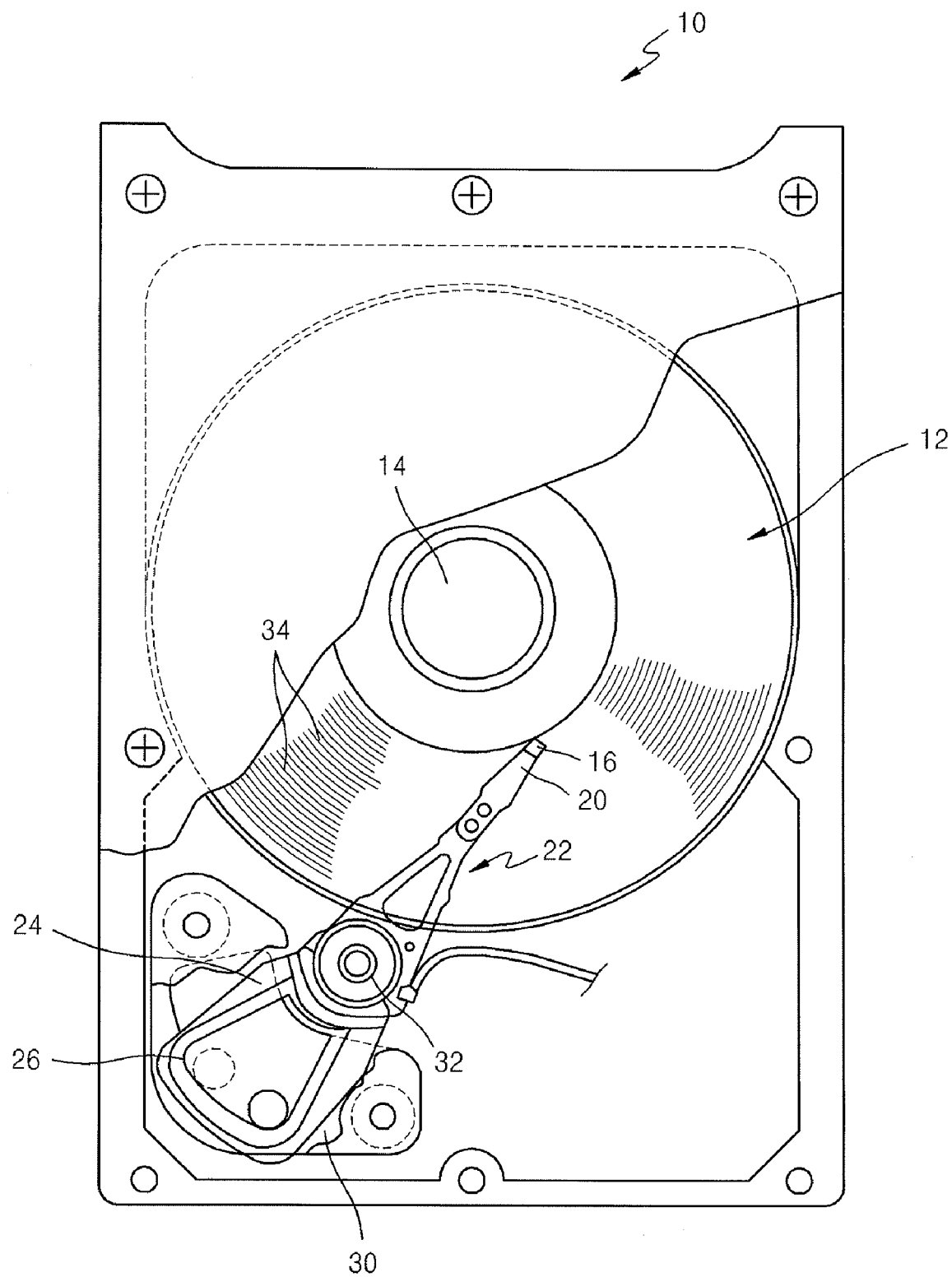
FIG. 1 is a schematic plan view illustrating a head disk assembly (HDA) of an HDD to which the present general inventive concept is applied.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An HDD includes a head disk assembly (HDA) composed of mechanical parts and an electrical circuit.

FIG. 1 is a schematic plan view illustrating an HDA 10 of an HDD to which the present general inventive concept is applied. Referring to FIG. 1, the HDA 10 includes at least one magnetic disk 12 rotated by a spindle motor 14. The HDA 10 also includes a transducer (not illustrated) adjacently located to a surface of the disk 12.

The transducer can read or write information from or to the disk 12 by sensing a magnetic field formed on the disk 12 or magnetizing the disk 12. Typically, the transducer is associated with the surface of the disk 12. Though a single transducer is described, the transducer includes a write transducer (writer) to magnetize the disk 12 and a separate read transducer (reader) to sense a magnetic field of the disk 12. The read transducer may be composed of a magneto-resistive (MR) component.

The transducer can be integrated into a magnetic head 16. The magnetic head 16 generates an air bearing between the transducer and the surface of the disk 12. The magnetic head 16 is integrated into a head stack assembly (HSA) 22. The HSA 22 is attached to an actuator arm 24 having a voice coil 26. The voice coil 26 is located adjacently to a magnetic assembly 28 to define a voice coil motor (VCM) 30. A current supplied to the voice coil 26 generates a torque which rotates the actuator arm 24 around a bearing assembly 32. The rotation of the actuator arm 24 moves the transducer across the surface of the disk 12.

Information is typically stored in concentric tracks of the disk 12. In general, each track 34 includes a plurality of sectors. Each sector includes a data field and a servo field. In the servo field, a preamble, a servo address/index mark (SAM/SIM), gray code, and burst signals are recorded. The transducer moves across the surface of the disk 12 to read information from another track or write information to another track.

Figure 2A:
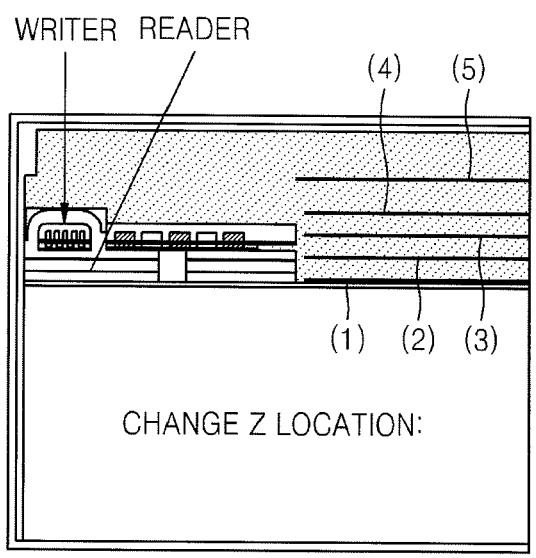
FIG. 2A illustrates a cross sectional view to explain a method of determining a location of a heater included in a magnetic head according to an embodiment of the present general inventive concept and FIG. 2B is a diagram illustrating a correlation between the location of the heater and expansion of an air bearing surface.
Figure 2B:
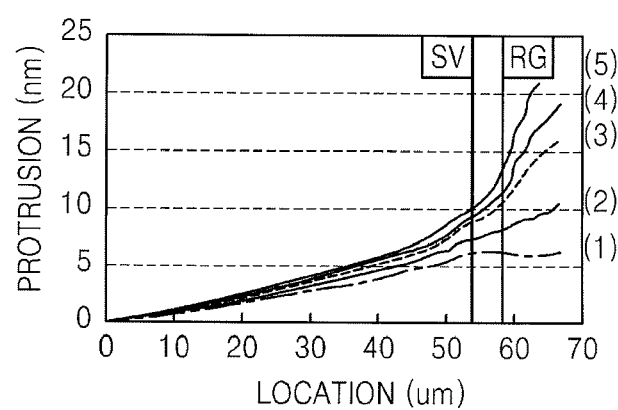

The magnetic head 16 to which the present general inventive concept is applied has a structure to generate an air bearing surface between the surface of the disk 12 and the reader and/or the writer and includes a heater to heat an assembly to generate the air bearing surface. The heater can be realized using a coil. As illustrated in FIG. 2A, a location Z of a heater coil having an optimal expansion condition is determined by applying a current to the heater coil while changing the location Z of the heater coil, and measuring an expansion of the air bearing surface of the magnetic head. In the diagram illustrated in FIG. 2B, the heater coil is installed at a location (1) at which the air bearing surface of the magnetic head is uniformly expanded compared to other locations between a reader position SV and a writer position RG.

Figure 3:
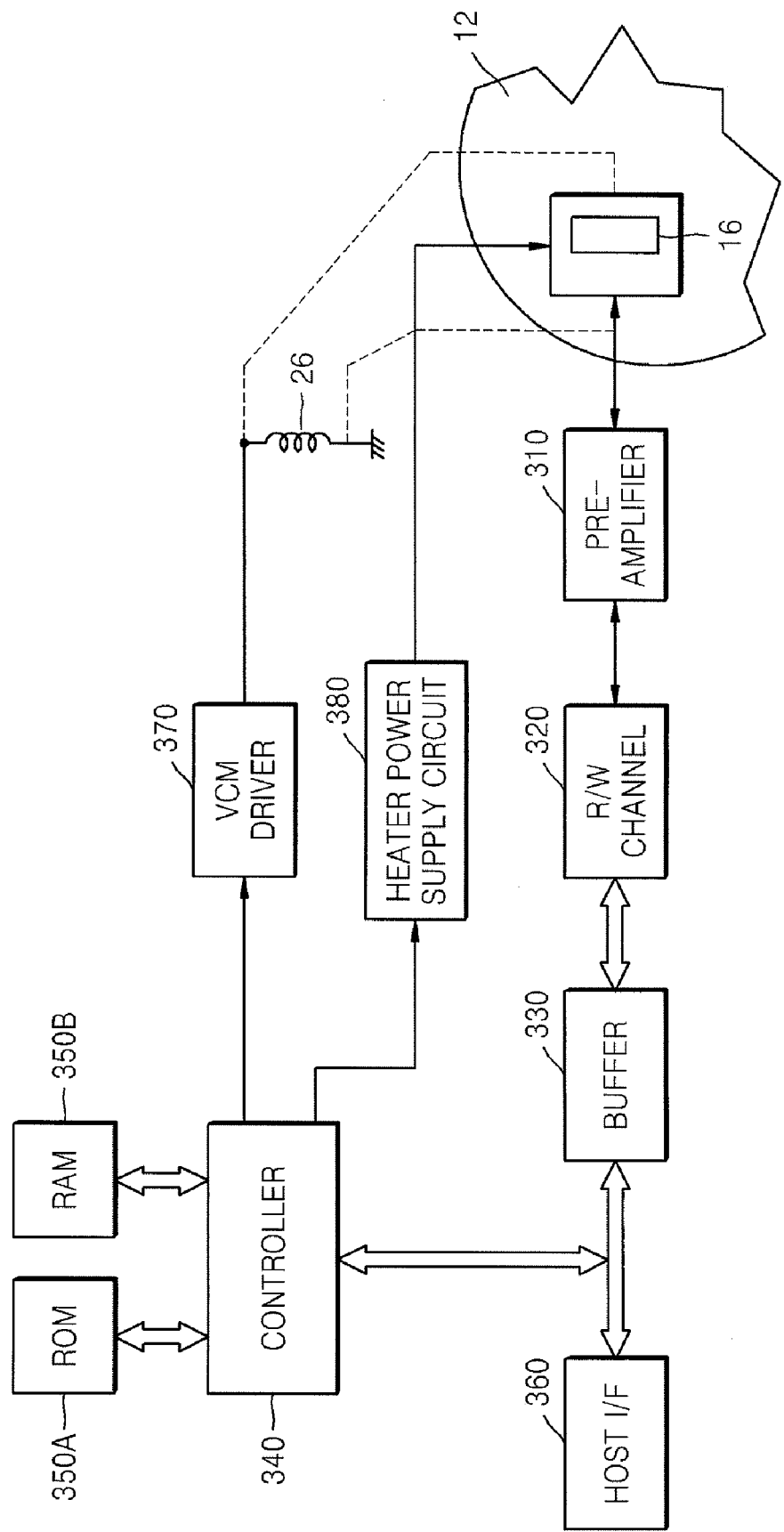
FIG. 3 is a block diagram illustrating an electrical circuit of an HDD according to an embodiment of the present general inventive concept.

As illustrated in FIG. 3, the HDD according to an embodiment of the present general inventive concept includes the disk 12, the magnetic head 16, a pre-amplifier 310, a read/write (R/W) channel 320, a buffer 330, a controller 340, a Read Only Memory (ROM) 350A, a Random Access Memory (RAM) 350B, a host interface 360, a VCM driver 370, and a heater power supply circuit 380.

Figure 4:
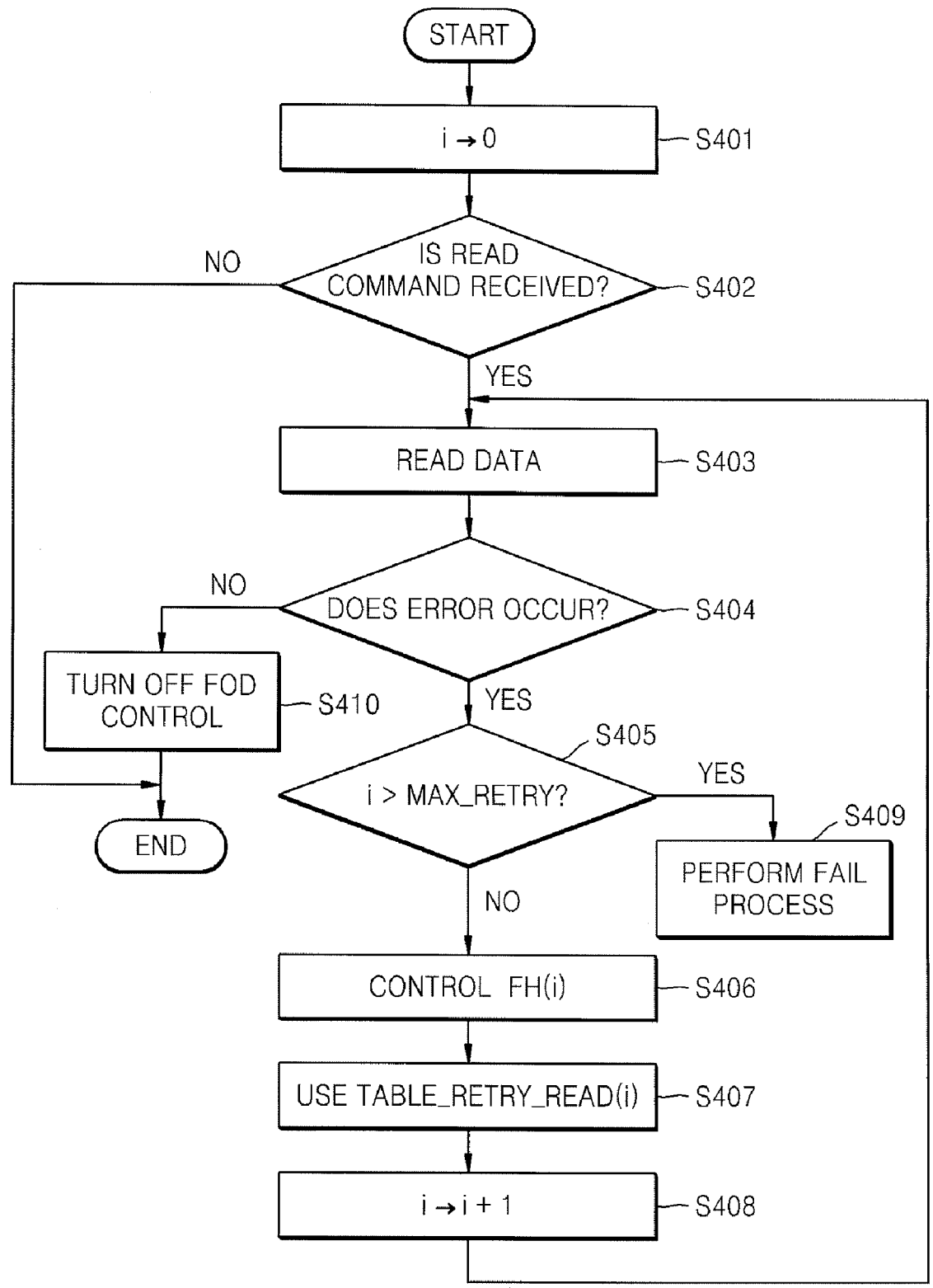
FIG. 4 is a flowchart illustrating a method of controlling a flying height of a magnetic head in a read retry mode according to an embodiment of the present general inventive concept.
Figure 5:
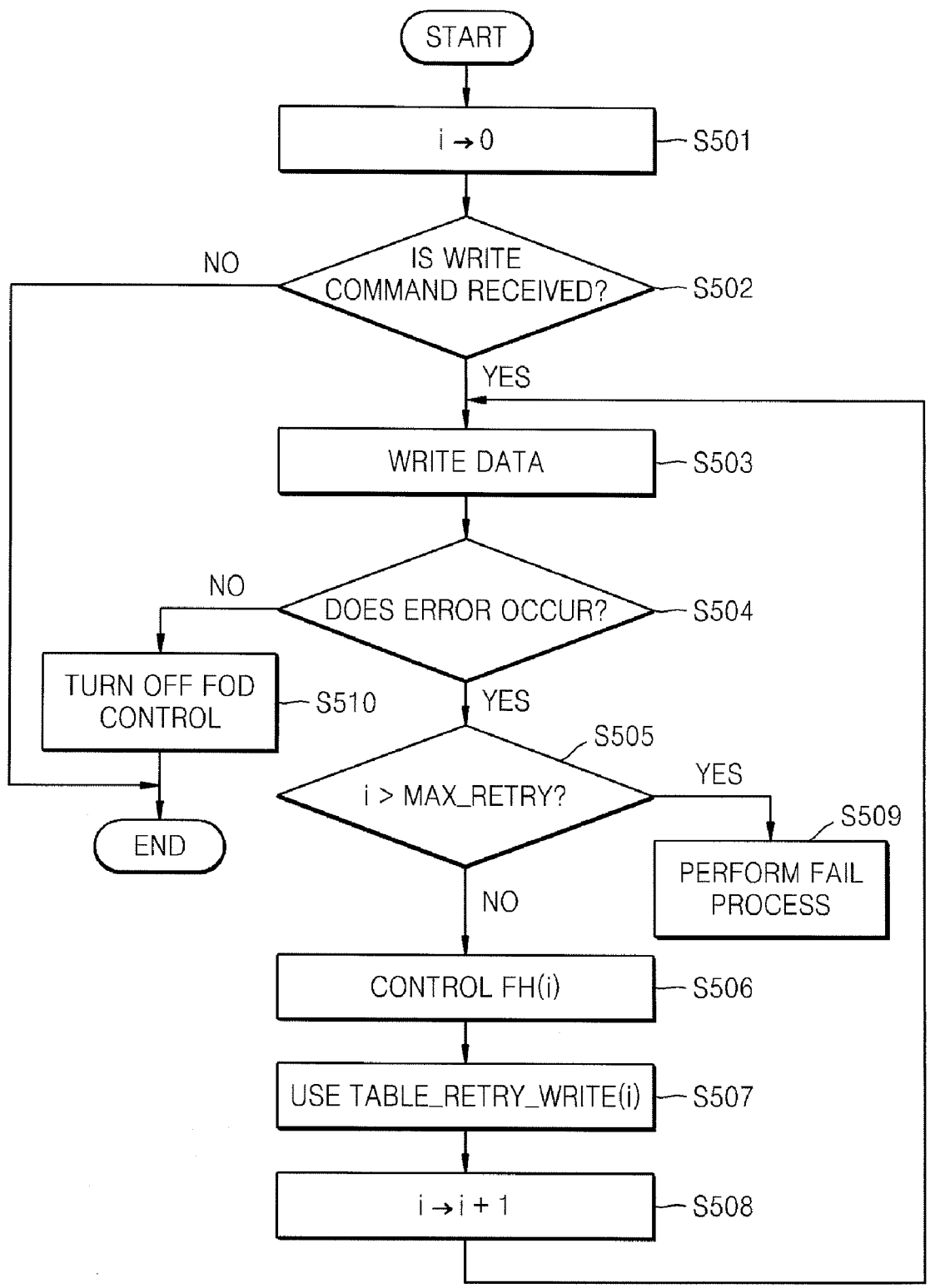
FIG. 5 is a flowchart illustrating a method of controlling a flying height of the magnetic head in a write retry mode according to an embodiment of the present general inventive concept.

The ROM 350A stores firmware and control information to control the HDD. The RAM 350B stores disk drive information read from the ROM 350A or the disk 12 when the HDD is turned on. Programs to execute the methods of controlling a flying height of the magnetic head 16 in read and write retry modes, which are illustrated in FIGS. 4 and 5, may also be stored in the ROM 350A.

The controller 340 analyzes a command received from a host device (not illustrated) through the host interface 360 and performs a control corresponding to an analysis result. The controller 340 provides a control signal to the VCM driver 370 in order to control activation of the VCM 30 and the movement of the magnetic head 16. The controller 340 also performs a control to adjust the flying height of the magnetic head 16 in a retry mode using the programs corresponding to the illustrations of FIGS. 4 and 5, which are stored in the ROM 350A.

A general operation of the HDD will now be described.

In a data read mode, the HDD amplifies an electrical signal sensed from the disk 12 by the read transducer of the magnetic head 16 in the pre-amplifier 310. The R/W channel 320 amplifies the signal amplified by the pre-amplifier 310 to a predetermined level by controlling a gain using an automatic gain control circuit (not illustrated), encodes the analog signal amplified to the predetermined level by the automatic gain control circuit into a digital signal which can be read by the host device, converts the digital signal to stream data, temporarily stores the stream data in the buffer 330, and transmits the stored stream data to the host device through the host interface 360.

In a data write mode, the HDD receives data from the host device through the host interface circuit 360, temporarily stores the received data in the buffer 330, sequentially outputs the data stored in the buffer 330, converts the output data to a binary data stream suitable for a write channel using the R/W channel 320, and records the binary data stream on the disk 12 through the write transducer of the magnetic head 16 using a write current amplified by the pre-amplifier 310.

The R/W channel 320 reproduces a preamble, a SAM/SIM, a gray code, and burst signals, which are recorded in a servo field of a sector of a track on the disk 12. The R/W channel 320 also provides information required for a track seek and track following control to the controller 340 by way of the buffer 330.

The heater power supply circuit 380 is enabled only in the retry mode and disabled in a normal mode. The heater power supply circuit 380 generates power corresponding to a power control signal to adjust the flying height of the magnetic head 16 in the retry mode and provides the generated power to the heater included in the magnetic head 16.

The power control signal is generated considering a number of retries by the controller 340. For example, the controller 340 can generate the power control signal to differentiate the flying height of the magnetic head 16 according to the number of retries and can be designed to generate the power control signal only in a specific retry process among a plurality of retry processes included in the retry mode if necessary.

Figure 6A:
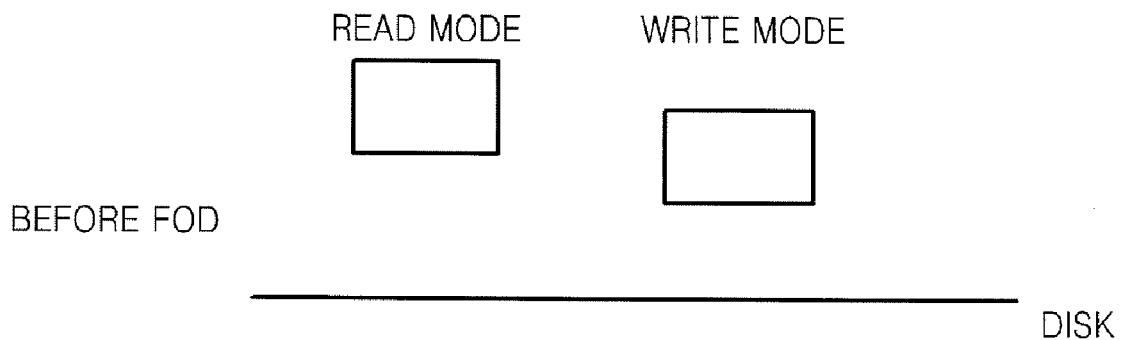
FIG. 6A is a diagram illustrating a difference between flying heights of the magnetic head in the read retry mode and in the write retry mode before power is supplied to a heater included in the magnetic head according to an embodiment of the present general inventive concept.
Figure 6B:
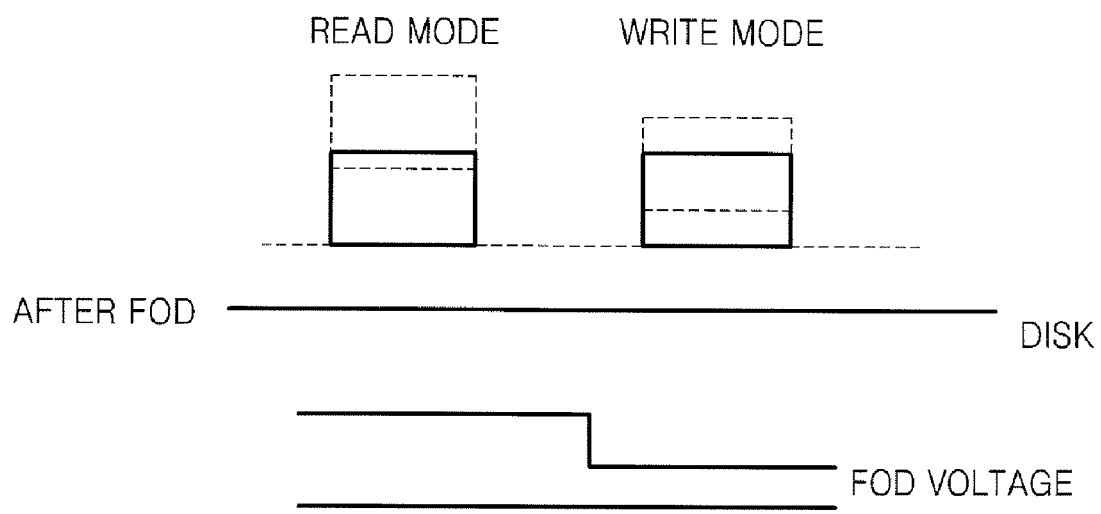
FIG. 6B is a diagram illustrating a difference between flying heights of the magnetic head in the read retry mode and in the write retry mode after power is supplied to a heater included in the magnetic head in a retry mode according to an embodiment of the present general inventive concept.

The controller 340 may generate the power control signal to differentiate the amplitude of power supplied to the heater in the read retry mode and in the write retry mode. In particular, it is effective that the power control signal is determined for the power supplied to the heater to be lower in the write retry mode compared to in the read retry mode, and can be determined to maintain the same flying height of the magnetic head 16 in the read retry mode and in the write retry mode as illustrated in FIG. 6B. FIG. 6A illustrates a difference between the flying heights of the magnetic head 16 in the read retry mode and in the write retry mode before a flying on demand (FOD) control is performed.

When the retry mode is terminated, the controller 340 controls the magnetic head 16 to maintain a general flying height by disabling the heater power supply circuit 380.

A method of controlling a flying height of the magnetic head 16 in the retry mode according to an embodiment of the present general inventive concept will now be described in detail.

FIG. 4 is a flowchart illustrating a method of controlling a flying height of the magnetic head 16 in the read retry mode according to an embodiment of the present general inventive concept.

Referring to FIG. 4, in operation S401, a counter i (not illustrated), which is included in the controller 340, to count the number of retries is reset to 0.

In operation S402, the controller 340 determines whether a read command is received from a host device (not illustrated) through the host interface 360.

If the read command is received, in operation S403, the controller 340 moves the magnetic head 16 to a target track by executing a seek control routine and reads data from the disk 12.

In operation S404, the controller 340 determines whether an error occurs in a process of reproducing the read data.

If an error occurs, the value of the counter i is compared to a maximum number of retries MAX_RETRY in operation S405.

If the value of the counter i is not greater than the maximum number of retries MAX_RETRY, the flying height of the magnetic head 16 is adjusted to a flying height FH(i) of the magnetic head 16, which is determined considering a number of retries, in operation S406. That is, if the controller 340 generates a power control signal to maintain the flying height FH(i) of the magnetic head 16, the heater power supply circuit 380 generates power corresponding to the power control signal and provides the power to the heater included in the magnetic head 16. Accordingly, the flying height of the magnetic head 16 is adjusted to FH(i).

The flying height FH(i) of the magnetic head 16 according to a number of read retries is determined through experiments when an HDD is designed. That is, the flying height FH(i) of the magnetic head 16 according to the number of retries is determined to minimize the number of read retries by obtaining a correlation between a flying height of the magnetic head 16 and an error occurrence rate through experiments.

For example, it can be designed that the flying height FH(i) of the magnetic head 16 according to the number of read retries is changed only in a specific retry process among a plurality of retry processes included in the read retry mode.

In addition, it can be designed that the flying height of the magnetic head 16 is adjusted to maintain a same flying height of the magnetic head 16 in the read retry mode and in the write retry mode.

After adjusting the flying height of the magnetic head 16, parameters corresponding to the number of retries are changed using a read retry table TABLE_RETRY_READ(i) in operation S407.

The counter i is increased by 1 in operation S408, and then the process goes back to operation S403 to perform data read at a location at which the error occurs.

If no error occurs as the determination result of operation S404 during the retry process, an FOD control turns off in operation S410. That is, a general flying height of the magnetic head 16 is maintained by disabling the heater power supply circuit 380. In other words, if the data can be read in the read retry process, the flying height of the magnetic head 16 adjusted in the read retry process is changed back to the general flying height of the magnetic head 16 at which the magnetic head 16 was positioned before the adjustment was made due to the error detection. If the data can be read without performing the read retry process, the currently set general flying height of the magnetic head 16 is maintained.

During the retry process, if the value of the counter i is greater than the maximum number of retries MAX_RETRY as the comparison result of operation S405, in operation S409, the read retry process is terminated, and a report to inform that data cannot be read is generated.

As described above, data read performance can be increased by adjusting the flying height of the magnetic head 16 in the read retry process.

FIG. 5 is a flowchart illustrating a method of controlling a flying height of the magnetic head 16 in the write retry mode according to an embodiment of the present general inventive concept.

Referring to FIG. 5, in operation S501, a counter i (not illustrated), which is included in the controller 340, to count the number of retries is reset to 0.

In operation S502, the controller 340 determines whether a write command is received from a host device (not illustrated) through the host interface 360.

If the write command is received, in operation S503, the controller 340 moves the magnetic head 16 to a target track by executing a seek control routine and writes data received from the host device on the disk 12.

In operation S504, the controller 340 determines whether an error occurs in a data write process.

If an error occurs, the value of the counter i is compared to the maximum number of retries MAX_RETRY in operation S505.

If the value of the counter i is not greater than the maximum number of retries MAX_RETRY, the flying height of the magnetic head 16 is adjusted to a flying height FH(i) of the magnetic head 16, which is determined considering the number of retries, in operation S506. That is, if the controller 340 generates a power control signal to maintain the flying height FH(i) of the magnetic head 16, the heater power supply circuit 380 generates power corresponding to the power control signal and provides the power to the heater included in the magnetic head 16. Accordingly, the flying height of the magnetic head 16 is adjusted to FH(i).

The flying height FH(i) of the magnetic head 16 according to a number of write retries is determined through experiments when an HDD is designed. That is, the flying height FH(i) of the magnetic head 16 according to the number of write retries is determined to minimize the number of write retries by obtaining a correlation between a flying height of the magnetic head 16 and an error occurrence rate through experiments.

For example, it can be designed that the flying height FH(i) of the magnetic head 16 according to the number of write retries is changed only in a specific retry process among a plurality of retry processes included in the write retry mode.

After adjusting the flying height of the magnetic head 16, parameters corresponding to the number of write retries are changed using a write retry table TABLE_RETRY_WRITE (i) in operation S507.

The counter i is increased by 1 in operation S508, and then the process goes back to operation S503 to perform data write at a location at which the error occurs.

During the retry process, if no error occurs as the determination result of operation S504, an FOD control turns off in operation S510. That is, a general flying height of the magnetic head 16 is maintained by disabling the heater power supply circuit 380. In other words, if the data can be written in the write retry process, the flying height of the magnetic head 16 adjusted in the write retry process is changed back to the general flying height of the magnetic head 16 at which the magnetic head 16 was positioned before the adjustment was made due to the error detection. If the data can be written without performing the write retry process, a currently set general flying height of the magnetic head 16 is maintained.

If the value of the counter i is greater than the maximum number of retries MAX_RETRY as the comparison result of operation S505, in operation S509, the write retry process is terminated, and a report to inform that data cannot be written is generated.

The present general inventive concept can be realized as a method, an apparatus, and/or a system. When the present general inventive concept is realized as software, components of the present general inventive concept are embodied as code segments to execute required operations. A program or the code segments can be stored in a processor readable recording medium and transmitted as computer data signals combined with a carrier using a transmission medium or a communication network. The processor readable recording medium may be any data storage device that can store or transmit data which can be thereafter read by a computer system. Examples of the processor readable recording medium include electronic circuits, semiconductor memory devices, read-only memory (ROM), flash memory, erasable ROM, floppy disks, optical disks, hard disks, optical fiber media, and RF networks. The computer data signals may include any signal which can be propagated via transmission media such as electronic network channels, optical fibers, air, electronic fields, RF networks.

As described above, according to embodiments of the present general inventive concept, by adjusting a flying height of a magnetic head in a read retry mode and in a write retry mode, a number of retries can be reduced, and a possibility of data read and write failure can be lowered.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to control a flying height of a magnetic head in a retry mode, the apparatus comprising:
a magnetic head comprising:
a magnetic read element to sense a magnetic field on a disk and a magnetic write element to magnetize the disk, having a structure to generate an air bearing surface between a surface of the disk and the magnetic read and write elements, and
a heater to heat an assembly to generate the air bearing surface;
a controller to generate a power control signal to adjust the flying height of the magnetic head in the retry mode; and
a heater power supply circuit to generate power corresponding to the power control signal and to supply the power to the heater,
wherein the controller disables the heater power supply circuit when the retry mode is terminated.

2. The apparatus of claim 1, wherein the controller generates the power control signal in only a specific retry process among a plurality of retry processes included in the retry mode.

3. The apparatus of claim 1, wherein the controller generates the power control signal to change the flying height of the magnetic head according to a number of retries.

4. The apparatus of claim 1, wherein the controller generates the power control signal to differentiate an amplitude of power supplied to the heater in read retry mode and in a write retry mode.

5. The apparatus of claim 4, wherein the power control signal is determined so that the power supplied to the heater is lower in the write retry mode as compared to in the read retry mode.

6. The apparatus of claim 1, wherein the power control signal is determined to maintain a same flying height of the magnetic head in the read retry mode and in the write retry mode.

7. A method of controlling a flying height of a magnetic head in a retry mode, the method comprising:
  determining whether the retry mode starts in a disk drive;
  if the retry mode starts, adjusting the flying height of the magnetic head with respect to a surface of a disk;
  performing a retry process while changing predetermined parameters according to a pre-set sequence after adjusting the flying height of the magnetic head; and
  disabling a heater power supply circuit when the retry mode is terminated.

8. The method of claim 7, wherein the flying height of the magnetic head is adjusted by changing power supplied to a heater included in the magnetic head.

9. The method of claim 8, wherein in the adjusting of the flying height of the magnetic head, the flying height of the magnetic head is adjusted to be the same in the read retry mode and in the write retry mode.

10. The method of claim 7, wherein the retry mode includes a read retry mode and a write retry mode.

11. The method of claim 7, wherein in the adjusting of the flying height of the magnetic head, the flying height of the magnetic head is adjusted in only specific retry process among a plurality of retry processes included in the retry mode.

12. The method of claim 7, wherein the flying height of the magnetic head is adjusted differently according to a number of retries of the retry process.

13. A computer readable recording medium to store a computer readable program to execute a method of controlling a flying height of a magnetic head in a retry mode, the method comprising:
  determining whether the retry mode starts in a disk drive;
  if the retry mode starts, adjusting the flying height of the magnetic head with respect to a surface of a disk;
  performing a retry process while changing predetermined parameters according to a pre-set sequence after adjusting the flying height of the magnetic head; and
  disabling a heater power supply circuit when the retry mode is terminated.

14. The computer readable recording medium of claim 13, wherein the flying height of the magnetic head is adjusted differently according to a number of retries of the retry process.

15. A disk drive, which is a data storage unit, comprising:
  a host interface to perform a data transmitting/receiving process with a host device;
  a disk to store information;
  a magnetic head comprising:
    a magnetic read element to sense a magnetic field on the disk and a magnetic write element to magnetize the disk, having a structure to generate an air bearing surface between a surface of the disk and the magnetic read and write elements, and
    a heater to heat an assembly generating the air bearing surface;
  a write/read circuit to perform a data write process on the disk or to reproduce data read from the disk;
  a controller to execute a retry routine by generating a power control signal to adjust the flying height of the magnetic head when an error occurs in the data write and read process performed by the write/read circuit; and
  a heater power supply circuit to generate power corresponding to the power control signal and to supply the power to the heater,
  wherein the controller disables the heater power supply circuit when the retry mode is terminated.

16. The disk drive of claim 15, wherein the controller generates the power control signal in only a specific retry process among a plurality of retry processes included in the retry mode.

17. The disk drive of claim 15, wherein the controller generates the power control signal to change the flying height of the magnetic head according to a number of retries.

18. The disk drive of claim 15, wherein the controller generates the power control signal to differentiate the amplitude of power supplied to the heater in a read retry mode and in a write retry mode.

19. The disk drive of claim 15, wherein the power control signal is determined to maintain a same flying height of the magnetic head in the read retry mode and in the write retry mode.

20. A disk drive comprising:
  a magnetic head to read data from a disk and to write data to the disk;
  a positioning unit to move the magnetic head with respect to the disk to create an adjustable air bearing surface between the surface of the disk and the magnetic head; and
  a controller to generate a power control signal to control the positioning unit in a retry mode of the reading of data or writing of data,
  wherein the magnetic head is disposed at a flying height with respect to the disk and the controller adjusts the flying height in a retry mode and disables the power control signal when the retry mode is terminated, and when the retry mode is terminated the magnetic head is returned to a predetermined flying height.

21. The disk drive of claim 20, wherein the controller generates the power control signal to adjust the air bearing surface by a certain amount based on a number of retries of the reading or writing operation.

22. A method of operating a disk drive to read data from a disk and to write data to the disk, the method comprising:
  reading data from or writing data to a disk using a magnetic head;
  generating a power control signal having a value based on a number of retries of the reading data or writing data;
  adjusting a position of the magnetic head with respect to the disk based on the generated power control signal; and
  disabling a heater power supply circuit when the retry mode is terminated.

23. A method of controlling a flying height of a magnetic head in a retry mode, the method comprising:
  positioning a magnetic head with respect to a disk;
  generating an adjustable air bearing surface between the surface of the disk and the magnetic head;
  controlling the positioning of the magnetic head in the retry mod of a reading of data or a writing of data; and
  disabling a heater power supply circuit when the retry mode is terminated.

24. A method of controlling a flying height of a magnetic head in a retry mode, the method comprising:
   generating an air bearing surface between a surface of disk and magnetic read and write elements;
   heating an assembly to generate the air bearing surface with a heater;
   generating a power control signal to adjust the flying height of the magnetic head in the retry mode;
   generating power corresponding to the power control signal and supplying the power to the heater; and
   disabling a heater power supply circuit when the retry mode is terminated.

* * * * *